July 13, 1948.  J. B. POLOMSKI  2,444,953
TRANSMISSION CONTROL SYSTEM
Filed Sept. 15, 1942  4 Sheets-Sheet 1
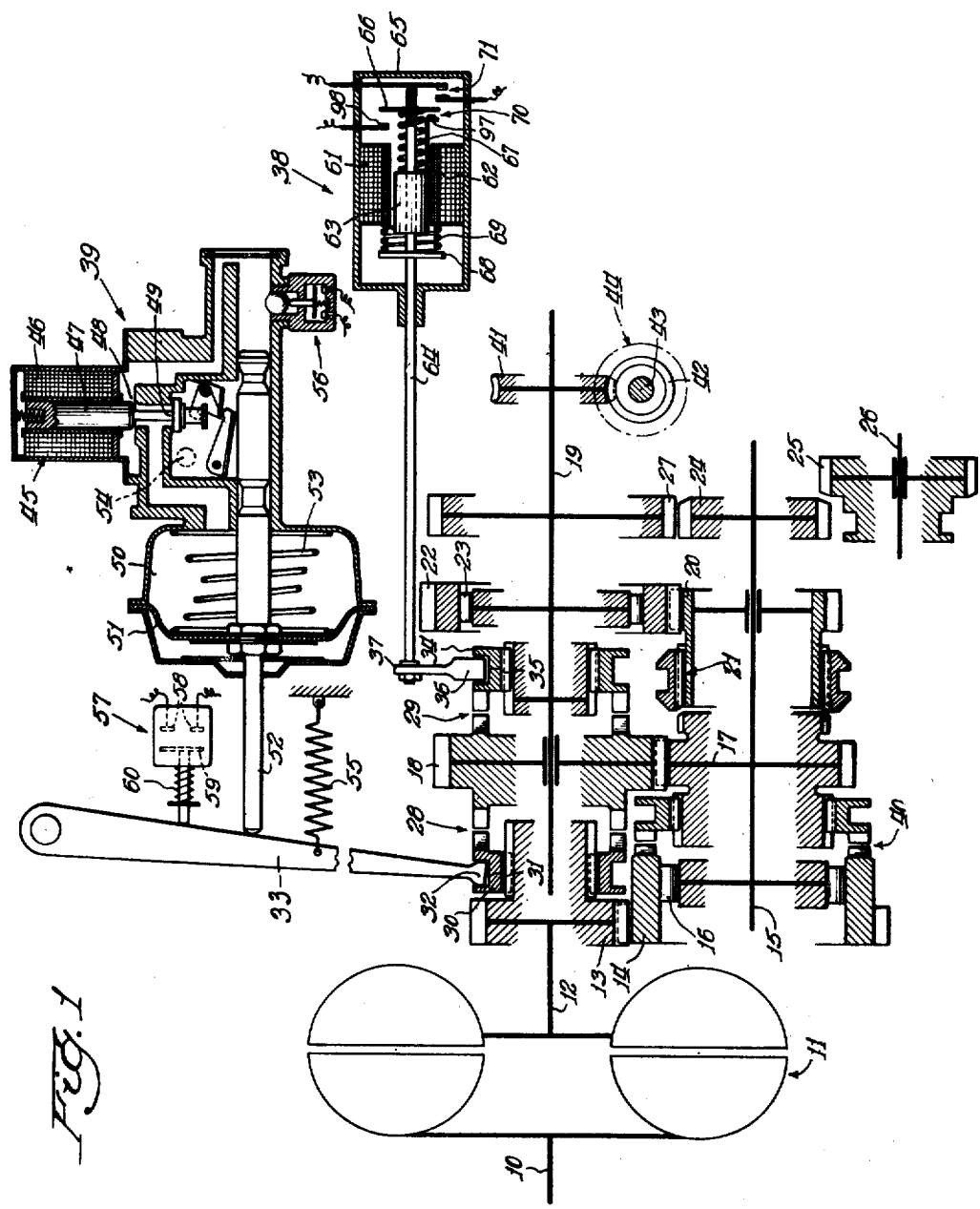
Inventor:
John B. Polomski
By
Edward C. Gitzbaugh
Atty.

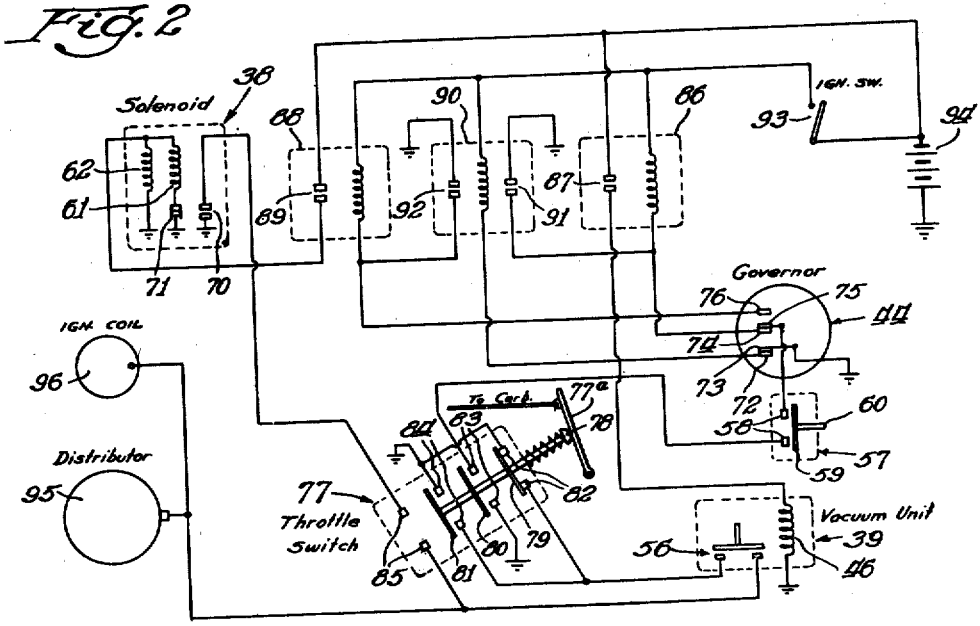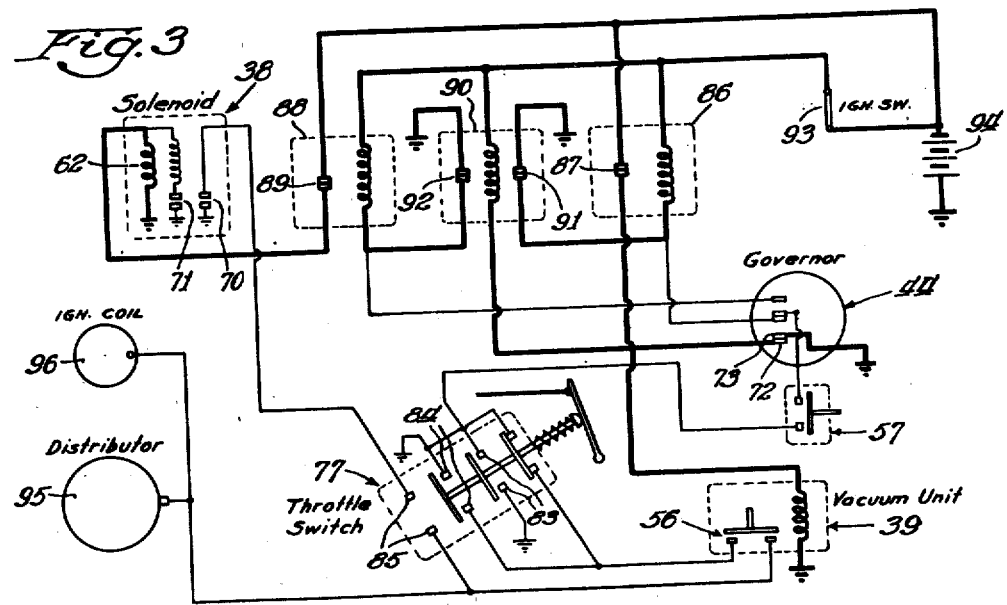

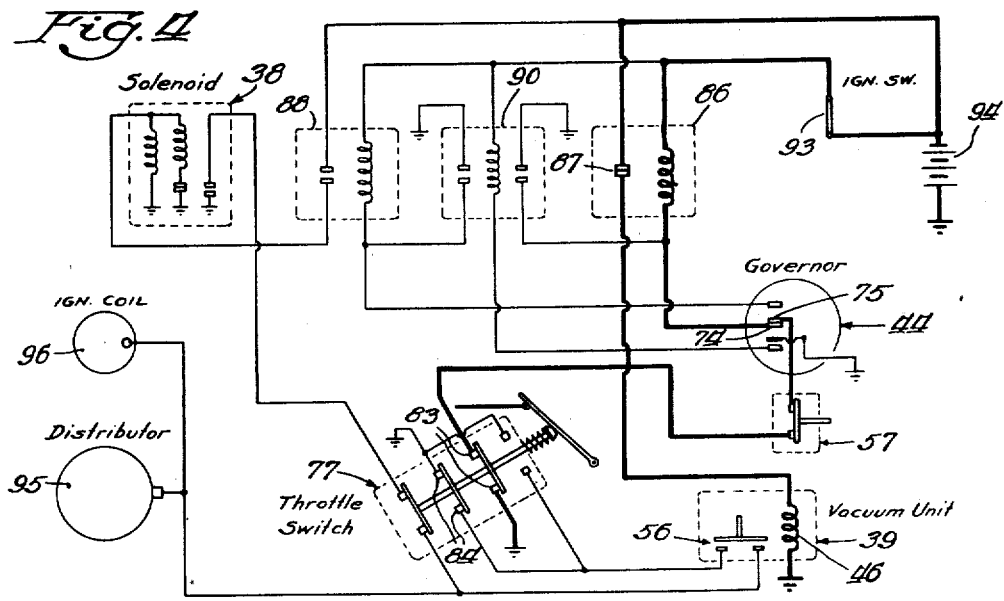
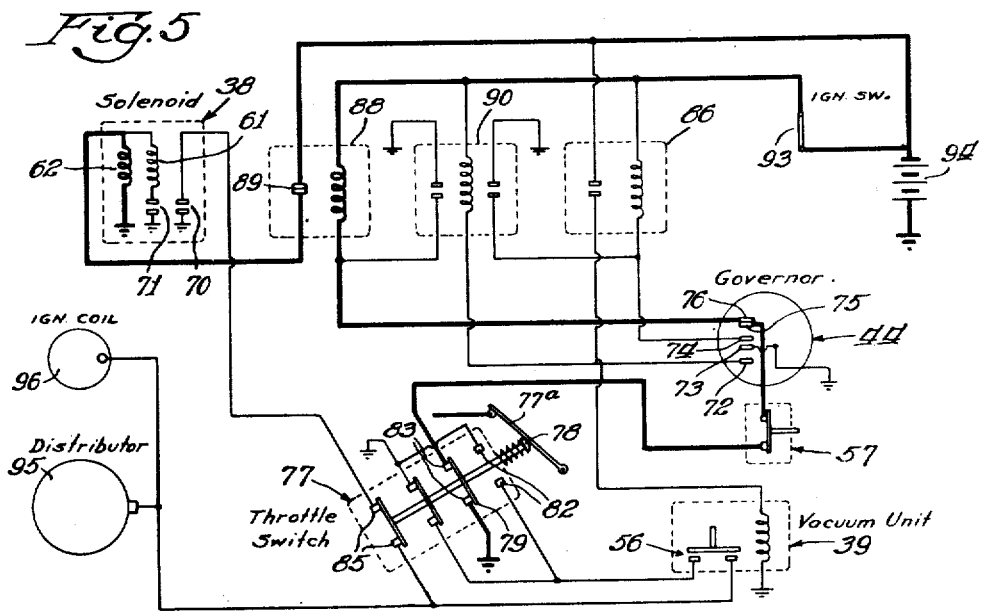

July 13, 1948. J. B. POLOMSKI 2,444,953
TRANSMISSION CONTROL SYSTEM
Filed Sept. 15, 1942 4 Sheets-Sheet 4

Inventor:
John B. Polomski
By: Edward P. Gritbaugh

Patented July 13, 1948

2,444,953

UNITED STATES PATENT OFFICE 2,444,953

TRANSMISSION CONTROL SYSTEM

John B. Polomski, Detroit, Mich., assignor to Borg-Warner Corporation, Chicago, Ill., a corporation of Illinois Application September 15, 1942, Serial No. 458,479

17 Claims. (Cl. 74—472)

This invention relates to a variable speed ratio power transmitting device of the automatic type such as may be used with automotive vehicles and particularly to a control system therefor.

There has been devised a four-speed automatic transmission having two Maybach type jaw clutches for controlling the shifts to the various speed ratios. This transmission incorporates an electrical control system for operating the two clutches in such a manner that the transmission normally starts in the lowest speed and then above a predetermined speed which is rather low both clutches are simultaneously actuated to make possible a shift into the highest speed. To provide a performance ratio however, it is possible to downshift under manual control to the third or next highest speed ratio. It has been found however that under certain circumstances it will be desirable to effect a second downshift to the second speed ratio, particularly (in the case of passenger automobiles) when the vehicle is moving between 15 and 25 miles per hour.

The principal object of this invention is to provide a means, in a transmission of the type described, for effecting a second downshift to provide increased performance for the vehicle in which the transmission is installed.

A more specific object of this invention is to provide an electrical control system for electromagnetic means controlling the operation of a pair of clutches wherein both clutches are operated by and under control of a governor switch upon increasing speed of the vehicle, and both clutches are individually operable under manual control for effecting downshifts in the transmission.

A still more specific object is to provide suitable switches, relays and other controls connected together in a manner to produce the desired result.

These and other objects and features of this invention will become apparent from the following detailed description and the accompanying drawings in which:

Fig. 1 is a schematic diagram of a transmission to which this invention is particularly well adapted, including cross-sections through the principal electrical controls therefor;

Fig. 2 is a wiring diagram showing how the controls are connected with the throttle-operated switch and with one another. In this figure the circuit is shown with current shut off and the vehicle standing still;

Figure 6:
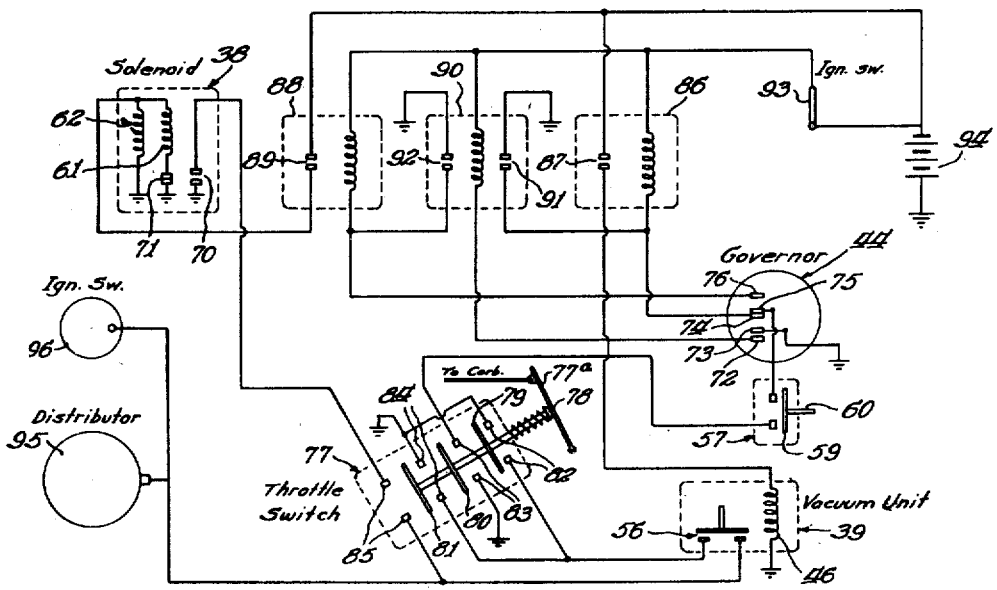

Fig. 3 is similar to the wiring diagram of Fig. 2, showing the condition of the various elements thereof when the ignition switch is turned on and the vehicle is moving less than 15 M. P. H.;

Fig. 4 shows the condition of the circuit when the vehicle is moving between 15 and 25 M. P. H. and the operator desires greater performance;

Fig. 5 shows the condition of the circuit when the vehicle is moving above 25 M. P. H. and the operator desires greater performance; and Fig. 6 shows the condition of the circuit when the vehicle is moving between 15 and 25 M. P. H. and the engine throttle is partially opened.

Referring now to Fig. 1 for a description of the transmission itself, the engine or power shaft 10 is shown connected to a hydrodynamic coupling 11 which functions as an automatic clutch and vibration absorber. Coupling 11 is in turn connected to a transmission input shaft 12 which transmits the power from the coupling to an input gear 13 in the transmission proper. Said gear 13 is in constant mesh with a gear 14 mounted on a countershaft 15 and drivably associated with the countershaft through a one-way clutch 16. Said clutch 16 is so arranged as to transmit torque from gear 14 to countershaft 15 and to break the connection so as to transmit no torque when countershaft 15 is the driver. On countershaft 15 is mounted a gear 17 of intermediate size which is in constant mesh with a gear 18 loosely mounted on output shaft 19 so as to be freely rotatable thereon. A smaller gear 20 is loosely mounted on countershaft 15 and is provided with a clutch 21 by which it may be made to rotate with countershaft 15. In mesh with gear 20 is a gear 22 which is adapted to drive output shaft 19 through a one-way clutch 23 when gear 22 is the driver.

A fourth gear 24 is mounted for rotation with countershaft 15 and is adapted to be meshed with an idler gear 25 slidably mounted on a second countershaft 26. Said idler gear 25 in turn is meshable with a gear 27 rotatable with driven shaft 19.

Gear 18 may be connected to gear 13 and to output shaft 19 by means of jaw clutches 28 and 29 respectively. Jaw clutch 28 is provided with a slidable toothed clutch element 30 having a groove 31 adapted to be contacted by the end 32 of a lever 33 the operation of which is controlled electromagnetically. Similarly, clutch 29 is provided with a toothed movable element 34 having an annular groove 35 in which is seated a yoke 36 having an arm 37 the movement of which is controlled by an electromagnet 38. The jaw clutches 28 and 29 are of the Maybach type, and the ends of the teeth of the engaging elements of each clutch are beveled, such that when the elements rotate in one direction relative to each other, the beveled tooth ends maintain the elements out of mesh, but when the relative rotation between the elements is reversed and the elements are substantially synchronized in speed, then the beveled tooth ends facilitate engagement of the elements.

The ratios obtainable through the transmission are as follows:

Neutral is obtained by releasing all of the clutches and sliding idler gear 25 to the position shown in Fig. 1.

Low speed is obtained by engaging clutch 21 and leaving clutches 28 and 29 disengaged. Idler 25 is left in the right hand position for all forward speeds. The gear train is then from shaft 12 and input gear 13 to gear 14, one-way clutch 16, countershaft 15, gear 17, clutch 21, gears 20 and 22, overrunning clutch 23 and output shaft 19.

For second speed, clutch 21 remains engaged and clutch 28 is also engaged. The gear train is then from input gear 13 to gear 14, overrunning clutch 16, countershaft 15, gear 17, gear 18, clutch 28 and output shaft 19. Although clutch 21 is engaged, driven shaft 19 is rotated faster than gear 22, and the overrunning clutch 23 will break the connection therebetween.

For third speed, clutch 21 remains engaged, clutch 28 is engaged, and clutch 29 is disengaged. The gear train is then from shaft 12 and gear 13 through clutch 28 to gear 18, thence through gear 17 on countershaft 15, clutch 21, gear 20, gear 22, overrunning clutch 23 to output shaft 19.

For fourth or direct speed both clutches 28 and 29 are engaged and the drive is then from gear 13 through clutch 28, gear 18 and clutch 29 to driven shaft 19.

Reverse is obtained by releasing all clutches, and sliding gear 25 to the left as shown in Fig. 1 so as to engage both gears 24 and 27. The drive is then from gear 13 to gear 14, overrunning clutch 16, countershaft 15, gear 24, gear 25 and gear 27 to output shaft 19.

In order to coast against the engine in second a lock-out clutch 40 is provided which locks out free-wheeling clutch 16 on countershaft 15. Other refinements may be employed in the transmission, but since they are not material to the invention they will not be described here in detail.

Secured to driven shaft 19 so as to be rotatable therewith is a gear 41 which drives a second gear 42 mounted on a shaft 43 which in turn drives a two-stage electric governor 44 of any suitable character. It is understood that although gear 41 is shown mounted on driven shaft 19, it might be mounted on any member of the transmission or vehicle the rotation of which bears a fixed relation to the movement of the vehicle.

The electric control device 39 for lever 33 is comprised of an electromagnet 45 having an operating coil 46 and an armature 47 influenced thereby which is connected to a pair of valves 48 and 49 controlling the pressure within a chamber 50 associated with the device. One wall of chamber 50 is formed by a diaphragm 51 which is secured to a rod 52 adapted to strike lever 33 and move it to the left as shown in Fig. 1 under the influence of a spring 53. With the valves 48 and 49 in the position shown in Fig. 1, chamber 50 is exposed to atmospheric pressure, the armature 47 being pulled up by energization of the coil 46. When the coil is deenergized, valves 48 and 49 are operated to close the chamber 50 to atmospheric pressure and to expose it to a source of vacuum, such as a conduit 54 connected with the intake manifold of an internal combustion engine (not shown) driving the shaft 19. Under the latter condition, rod 52 will be withdrawn to the right.

A spring 55 having one end anchored to a fixed point on the transmission causes lever 33 to follow rod 52 when the latter is withdrawn. A switch 56 is successively closed and then opened by the movement of rod 52. Said switch 56 controls the ignition circuit.

A fixedly mounted switch 57 having a single pair of contacts 58 adapted to be closed by a bar 59 is operated by lever 33 to close the contacts when clutch 28 is engaged. A spring 60 normally maintains the contacts open. The function of this switch will be described with reference to the detailed description of the circuits.

Electric control 38 is comprised of a solenoid 61, a holding coil 62, an armature 63, and an operating rod 64 all coaxially arranged in a housing 65. Rod 64 is directly connected to arm 37 of yoke 36 so as to cause the latter to move with rod 64. Armature 63 engages a head 66 on rod 64 by means of a spring 67. An abutment 68 is provided near the opposite end of solenoid 61, the abutment being secured to rod 64 and constantly biased to the left as shown in Fig. 1 by a spring 69. When solenoid 61 is energized along with holding coil 62, armature 63 is moved to the right as shown in Fig. 1 thereby compressing spring 67 against head 66 to pull rod 64 to the right and thereby disengage clutch 29. In so doing spring 69 is compressed so that as soon as solenoid 61 and holding coil 62 are deenergized, spring 69 will cause a reverse movement of rod 64 which will result in the engagement of clutch 29.

Two switches 70 and 71 are provided to control the operation of the electric device and the ignition circuit. Switch 70 is normally open when the solenoid 61 and holding coil 62 are deenergized whereas switch 71 is closed. Switch 71 controls a circuit to the solenoid 61 such that as soon as armature 63 is pulled up, the circuit through the solenoid will be broken. Switch 70 controls the ignition circuit and is comprised of the head 66 which is insulated from rod 64, a contact 97 movable with armature 63 and a contact 98 fixed to housing 65. Switch 70 is open when the solenoid is deenergized and when clutch 29 is fully engaged. It is closed when clutch 29 is engaged as soon as armature 63 is pulled up by energization of solenoid 61. Under these conditions head 66 engages contact 98 while contact 97, although normally held away from head 66 by spring 67, likewise engages head 66, the latter remaining stationary because of the torque load on clutch 29. Switch 70 is therefore closed and the ignition is temporarily interrupted. This removes the torque load on clutch 29 and spring 67 then pulls rod 64 to the right to disengage the clutch. With the movement of rod 64, head 66 disengages contact 98 and the ignition is restored.

To facilitate the description of the circuits, electric control device 38 will be referred to hereinafter as the solenoid and the electric device 39 will be referred to as the vacuum unit.

Referring now to Fig. 2 for a description of the circuits, it will be observed that governor 44 is comprised of a low speed pair of contacts 72 and 73, the latter contact 73 being movable in accordance with the speed of the vehicle, a second pair of contacts 74 and 75 the latter contact 75 being again movable in accordance with the speed of the vehicle, and a third pair of contacts which includes the movable contact 75 and a fixed contact 76. Contact 73 is so arranged as to remain in engagement with contact 72 until the vehicle reaches a speed of approximately 15 M. P. H., and contact 75 is so adjusted as to remain in engagement with contact 74 until a speed of approximately 25 M. P. H. is reached, whereupon it will snap upward and engage contact 76.

A throttle switch 77 is provided which is operated by the accelerator pedal 77a through a rod 78 on which are mounted bars 79, 80 and 81. Four sets of contacts are adapted to be operated by the bars, the contacts being shown at 82, 83, 84 and 85. In addition to throttle switch 77, a vacuum unit relay 86 having a single pair of contacts 87, a solenoid relay 88 having a single pair of contacts 89 and a control relay 90 having two pairs of contacts 91 and 92 are also provided. Relay 90 controls the energization of relays 86 and 88, under certain conditions.

The circuit also includes an ignition switch 93, a battery 94, a distributor 95 and an ignition coil 96.

The various circuits will now be described in the principal operating conditions for the vehicle.

*Ignition turned off and vehicle standing still.*— This condition is shown in Fig. 2 and it will be observed that all of the relay contacts are broken, switch 70 is open, switch 71 of the solenoid 61 is made and the two lowermost pairs of contacts in the governor are likewise made. Neither the solenoid nor the vacuum unit however is energized and accordingly clutch 29 may be engaged so that the engine of the vehicle may be started by towing or pushing the vehicle, the lock-out clutch 40 being manually engaged for this purpose.

*Ignition on, vehicle moving from 0 to 15 M. P. H.*—This condition is shown in Fig. 3 and it will be observed that all three relays 86, 88 and 90 are energized as well as holding coil 62 of the solenoid and the coil of the vacuum unit. This means that both clutches 28 and 29 are disengaged and the vehicle, if it is moving, is in low speed. Under these conditions the operation of throttle switch 77 so as to complete the circuits across contacts 83, 84 and 85 has no effect upon either the solenoid or the vacuum unit.

*Ignition on, vehicle moving between 15 and 25 M. P. H.*—This condition is shown in Fig. 6, and it will be observed that all of the relay contacts are broken, switch 70 is open, switch 71 is made, and the contact 73 is out of contact with the contact 72 of the governor. The contact 73, in moving out of contact with the contact 72, disconnects the ground connection provided by the governor as shown in Fig. 3, and the relays and the vacuum unit operating coil and solenoid are thereby deenergized. On such deenergization of the vacuum unit operating coil and solenoid, the spring 55 is effective to move the clutch element 30 into contact with teeth on the gear 18 forming part of the clutch 28, and the spring 59 is effective to move the clutch element 34 into contact with teeth on the gear 18 forming part of the clutch 29. The clutches 28 and 29 are thereby conditioned for engagement. When the accelerator 77a is thereafter released to allow the accelerator to move to its minimum power setting, then the elements of the clutches 28 and 29 synchronize, and the clutches 28 and 29 engage. The direct drive power train is thus completed, and the shaft 19 is driven at the same speed as the shaft 12. Although the direct drive power train is ordinarily completed in the 15 to 25 M. P. H. speed range, it is apparent that the power train may similarly be completed above 25 M. P. H., since the contact 73 remains out of contact with contact 72, and the circuit including contacts 75 and 76, which are brought together at 25 M. P. H., is broken at switch 57 and at contacts 83.

*Ignition on, vehicle moving between 15 and 25 M. P. H. and throttle switch 77 in downshifting position.*—This condition is shown in Fig. 4. When the shift was made into direct drive, switch 57 was operated by arm 33 to close its contacts and complete the circuit from contact 75 of governor 44 to one of the contacts 83 of throttle switch 77. Thus with the throttle switch in the downshifting position a circuit is completed from the battery through relay 86, governor contacts 74 and 75, switch 57 and contacts 83 of the throttle switch 77 to ground. This closes contacts 87 of relay 86 and energizes the operating coil 46 of the vacuum unit, which controls the shift of the clutch 28. It will be recalled that when the vacuum unit operating coil 46 is energized, rod 52 will move outward under the influence of spring 53 to disengage clutch 28. This is facilitated by switch 56 operated by rod 52 which momentarily completes a circuit from the ignition coil and distributor through contacts 84 of the throttle switch to ground, thus interrupting the ignition to relieve the teeth of clutch 28 of torque. Spring 53 of the vacuum unit then snaps the movable element 30 of clutch 28 to disengaged position. When this occurs switch 57 will of course be operated to break the circuit therethrough and the vacuum unit operating coil will again be deenergized, thereby creating the conditions for reengaging clutch 28 as soon as the operator releases the accelerator pedal sufficiently long to synchronize the elements of clutch 28. The downshifting position of throttle switch 77 corresponds to the kickdown position or maximum power setting of the accelerator pedal 77a. It will be observed that under the conditions described above the operation of the throttle switch has no effect whatsoever upon the solenoid for operating clutch 29.

*Vehicle moving above 25 M. P. H. in direct drive, throttle switch in downshifting position.*—This condition is shown in Fig. 5. As before switch 57 is again operated to close the contacts therethrough and thus complete a circuit from contact 75 of the governor through contacts 83 of throttle switch 77 to ground. Since contact 75 at speeds above 25 M. P. H. breaks the circuit through contact 74 which controls relay 86 and makes the circuit through contact 76 which controls relay 88, the latter will be operated and will energize the solenoid. The solenoid is shown in Fig. 5 in the condition obtaining after operating coil 61 has ceased to function by virtue of the breaking of contact 71, and holding coil 62 is functioning to maintain armature 63 in its pulled up position. Since contacts 85 of the throttle switch are made, the temporary closing of the switch 70 by the movement of armature 63 against head 66 as described above will ground the ignition and thereby relieve clutch 29 of torque temporarily. When the movable element 34 of clutch 29 is withdrawn following the removal of torque therefrom, both sets of contacts 70 and 71 are of course opened and the transmission will be conditioned for third speed operation as long as the throttle switch 77 is maintained in its depressed position. It will be observed that no downshift to second speed is possible above 25 M. P. H. due to the transfer of governor contact 75 from contact 74 to contact 76.

The contacts 82 of throttle switch 77 are used merely to remove the torque load on both clutches when the vehicle is coasting to a stop and the normal idling speed of the engine is such that it tends to drive the output shaft at a speed in excess of the speed at which the contacts 72 and 73 are adapted to close. These contacts 82 also serve to remove such torque load when the vehicle is driving uphill in direct drive and its speed drops below fifteen miles per hour. The hydraulic coupling produces a constant drag even at idling speeds of the engine and accordingly the teeth of both clutches would be constantly loaded once they were engaged and could not be disengaged automatically under the influence of the power devices provided. Contacts 82 are therefore arranged to be operated at the released position of the accelerator pedal, when the output shaft has slowed down below the speed at which contacts 72 and 73 close to condition the control system to disconnect both clutches 28 and 29. When the vehicle is moving uphill in direct drive below fifteen miles per hour, momentary release of the accelerator pedal will complete a circuit to ground through closed switch 56 by connecting the contacts 82. Torque on clutches 28 and 29 is thereby relieved so that they may be disengaged. If the vehicle is merely coasting to a stop on level ground with the accelerator released, the vehicle brake may be employed to cause the vehicle to move less than fifteen miles per hour for conditioning clutches 28 and 29 for disengagement, whereupon the ignition will be interrupted by the circuit to ground through switch 56 and contacts 82. In the form shown contacts 82 are connected by switch bar 79 which also serves in kickdown position to connect contacts 83.

Numerous other refinements and interlocks may be provided for the transmission as desired without departing from the spirit of the invention. It should be understood therefore that the scope of this invention is not intended to be limited to the above illustrative description but is to be determined by the appended claims.

I claim:

1. A variable speed ratio power transmitting device comprising input and output members, a plurality of gear trains for driving the output member from the input member, at least two coupling means for establishing said gear trains, and means for controlling the operation of the coupling means, said control means including an accelerator for controlling the power impressed on said input member, means under the control of said accelerator for simultaneously effecting an operation of the coupling means in one sense when said accelerator is moved to its minimum power setting and means under the control of said accelerator for individually effecting an operation of the coupling means in the opposite sense when said accelerator is moved to its maximum power setting.

2. A variable speed ratio power transmitting device comprising input and output members, a plurality of gear trains for driving the output member from the input member, at least two coupling means for establishing said gear trains, and means for controlling the operation of the coupling means, said controlling means including an accelerator for controlling the power impressed on said input member, means under the control of said accelerator for simultaneously conditioning the coupling means to effect an upward change in speed of the output member when said accelerator is moved to its minimum power setting and means under the control of said accelerator for conditioning the coupling means individually to effect different downward changes in speed of said output member when said accelerator is moved to its maximum power setting.

3. A variable speed ratio power transmitting device comprising input and output members, a plurality of gear trains for driving the output member from the input member, said gear trains including low, second, third and fourth speed ratios, at least two coupling means for establishing said gear trains, and means subject to the influence of the speed of the output member and controlling the operation of the coupling means, an accelerator for controlling the power impressed on said input member said controlling means being under the control of said accelerator and being adapted to effect an upshift from low to fourth speed directly on an operative stroke of the accelerator, and means under the control of the accelerator and subject to the influence of the speed of the output member for effecting shifts individually from fourth speed to third speed and from fourth speed to second speed on operative strokes of the accelerator.

4. A variable speed ratio power transmitting device comprising input and output members, a plurality of gear trains for driving the output member from the input member, at least two coupling means for establishing said gear trains, electromagnetic means for controlling the operation of the coupling means, means subject to the influence of the speed of one of the members and adapted to cause the electromagnetic means to operate said two coupling means simultaneously, and a circuit including additional means controlled by the speed of the output member and a plurality of manually controlled switches for individually operating said electromagnetic means in a reverse sense.

5. A variable speed ratio power transmitting device comprising input and output members, a plurality of gear trains for driving the output member from the input member, at least two coupling means for establishing said gear trains, and electromagnetic means for conditioning the coupling means for operation, said electromagnetic means comprising a solenoid for each coupling means, a relay for each solenoid, a relay controlling both solenoid relays, and speed responsive means controlling the last-mentioned relay whereby both coupling means may be operated simultaneously when a predetermined speed is reached.

6. A variable speed ratio power transmitting device as described in claim 5, and manually operable means and a switch operated by one of said coupling means, for overruling the speed responsive means as to one of the solenoid relays, whereby to operate only one of the coupling means to effect a downward change in speed.

7. A variable speed ratio power transmitting device as described in claim 5, and means for overruling the speed responsive means including manually operable switch, a coupling operated switch, and a second speed responsive switch whereby one of the coupling means may be operated to effect a downward change of speed within a predetermined range of speeds only.

8. A variable speed ratio power transmitting device as described in claim 5, and means operable within one range of speeds for overruling the speed responsive means and effecting an operation of one of the coupling means to produce a downward change in speed, and operable within another range of speeds, for overruling the speed responsive means and effecting an operation of the other coupling means to produce another downward change in speed.

9. A variable speed ratio power transmitting device comprising input and output members, a plurality of gear trains for driving the output member from the input member including low, second, third and direct drive, at least two couplings for establishing said gear trains, electromagnetic means for conditioning the coupling means for operation, said electromagnetic means comprising a solenoid for each coupling means, a relay for each solenoid, a relay controlling both solenoid relays, and a switch controlled by the speed of the output member for controlling the last-mentioned relay whereby both couplings may be operated simultaneously to produce a direct drive when a predetermined speed is reached.

10. A variable speed ratio power transmitting device comprising input and output members, a plurality of gear trains for driving the output member from the input member including low, second, third and direct drives, at least two coupling means for establishing said gear trains, electromagnetic means for conditioning the coupling means for operation, said electromagnetic means including a solenoid for each coupling means, a relay for each solenoid, a relay for controlling both solenoid relays, a switch operated in response to the speed of the output member for controlling the last-mentioned relay whereby both couplings may be operated simultaneously to produce a direct drive from low when a predetermined speed of the output member is reached, a foot pedal operated throttle control member having maximum and minimum power positions, and a switch operated by the pedal at its maximum power operating position for effecting a downshift from direct drive to third speed, thereby overruling the governor.

11. A variable speed ratio power transmitting device comprising input and output members, a plurality of gear trains for driving the output member from the input member at low, second, third and direct drives, at least two coupling means for establishing said gear trains, a foot-operated pedal for controlling the power impressed upon the input member, said pedal being movable from a minimum power setting to a maximum power setting, electromagnetic means for conditioning the coupling means for operation, said electromagnetic means including a solenoid for each coupling means, a relay for each solenoid, a relay controlling both solenoid relays, a switch controlled by the pedal at its maximum power setting and a switch controlled by the speed of the output member for controlling the last-mentioned relay, whereby both couplings may be simultaneously operated when a predetermined speed of the output member is reached to effect a shift from low to direct drive, and a second speed responsive switch controlled by different speed ranges of the output member, said pedal-operated switch and the second speed responsive switch together being adapted in one speed range of the output shaft to effect a shift from direct drive to third speed and in another speed range to effect a shift from direct drive to second speed, when the pedal-controlled switch is moved to its maximum power setting.

12. A variable speed ratio power transmitting device as described in claim 11, the shift from direct drive to third speed being effective only in one predetermined range of speeds of the output member and the shift from direct drive to second speed being effective in a lower range of speeds of the output member.

13. A variable speed ratio power transmitting device as described in claim 11, and means for interrupting the ignition when a downshift is to be effected from direct drive to third speed and from direct drive to second speed.

14. A variable speed ratio power transmitting device comprising input and output members, a plurality of gear trains for driving the output member from the input member, at least two coupling means for establishing said gear trains, power means for controlling the operation of the coupling means, an accelerator for controlling the power impressed on said input member, means subject to the influence of the speed of one of the members and under the control of said accelerator and adapted to cause the power means to operate said two coupling means simultaneously when said accelerator is moved to its minimum power setting, and a power circuit including an additional means controlled by the speed of the output member and a plurality of manually operated devices under the control of said accelerator for individually operating said power means in a reverse sense when the accelerator is moved to its maximum power setting.

15. In a transmission system, in combination, an input member; means for supplying torque to said input member and including an electrical ignition system; an output member; coupling means for establishing a driving relationship between said members; means for shifting said coupling means to disestablish said driving relationship; means, including means responsive to a predetermined speed of the output member for conditioning said shifting means to shift said coupling means to disestablish said driving relationship when the speed of the output member is below said predetermined speed; an accelerator for regulating the torque supplied to the input member by said torque supplying means; and means rendered effective by movement of said accelerator to its released position to interrupt said ignition system, when the output member is moving below said predetermined speed, to cause operation of said shifting means to disestablish said driving relationship.

16. In a transmission system, in combination, an input member; an engine for supplying torque to said input member and including an electrical ignition system; an output member; coupling means for establishing a driving relationship between said members; means for shifting said coupling means to disestablish said driving relationship; means, including means responsive to a predetermined speed of the output member, for conditioning said shifting means to shift said coupling means to disestablish said driving relationship when the speed of the output member is below said predetermined speed; an accelerator for regulating the torque supplied to the input member by said engine; and means, including a switch closed by movement of said accelerator to its released postion, to interrupt said ignition system, when the output member is moving below said predetermined speed, to cause operation of said shifting means to disestablish said driving relationship.

17. In a transmission system, in combination, an input member; an engine for supplying torque to said input member and including an electrical ignition system; an output member; coupling means for establishing a driving relationship between said members; electrical control means responsive to a predetermined speed of the output member; means for shifting said coupling means to disestablish said driving relationship; electromagnetic means, rendered effective by said last-named means when the output member is moving below a predetermined speed, for conditioning said shifting means to shift said coupling means to disestablish said driving relationship; an accelerator for regulating the torque supplied to the input member by said engine; and means, including a switch closed by movement of said accelerator to its released position, to interrupt said ignition system, when the output member is moving below said predetermined speed, to cause a fluctuation in the torque supplied by the engine in order to cause operation of said shifting means to disestablish said driving relationship.

JOHN B. POLOMSKI.

REFERENCES CITED

The following references are of record in the file of this patent:

UNITED STATES PATENTS

| Number | Name | Date |
|---|---|---|
| 1,985,884 | Banker | Jan. 1, 1935 |
| 2,012,296 | Banker | Aug. 27, 1935 |
| 2,151,714 | Pavesi | Mar. 28, 1939 |
| 2,225,493 | Barnes | Dec. 17, 1940 |
| 2,237,297 | Banker | Apr. 8, 1941 |
| 2,257,674 | Dunn | Sept. 30, 1941 |
| 2,257,838 | Claytor | Oct. 7, 1941 |
| 2,304,863 | Thompson | Dec. 15, 1942 |
| 2,328,291 | Osborne | Aug. 31, 1943 |
| 2,333,668 | Neracher et al. | Nov. 9, 1943 |
| 2,339,473 | Griswold et al. | Jan. 18, 1944 |
| 2,342,960 | Neracher et al. | Feb. 29, 1944 |
| 2,343,312 | Maurer | Mar. 7, 1944 |